US006615161B1

United States Patent
Carney et al.

(10) Patent No.: US 6,615,161 B1
(45) Date of Patent: Sep. 2, 2003

(54) METHOD AND APPARATUS FOR ADJUSTING AN INTERVAL OF POLLING A PERIPHERAL DEVICE IN RESPONSE TO CHANGES IN THE STATUS AND/OR RELIABILITY OF RECEIVING TRAPS

(75) Inventors: Dennis Michael Carney, Louisville, CO (US); Karen Lynn Harrison, Longmont, CO (US); Katherine McCue Melton, Boulder, CO (US); Ryan Hoa Nguyen, Westminster, CO (US); Stephen Goddard Price, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/112,703

(22) Filed: Jul. 8, 1998

(51) Int. Cl.[7] ................................................ G06F 11/30
(52) U.S. Cl. ............................ 702/186; 710/15; 710/46
(58) Field of Search ................................ 702/182, 183, 702/186, 81, 82, 176; 710/15, 18, 19, 46, 220; 370/450, 453, 454, 457; 709/223, 224

(56) References Cited

U.S. PATENT DOCUMENTS

| 5,483,676 A | * | 1/1996 | Mahany et al. | 455/67.4 |
| 5,537,550 A | * | 7/1996 | Russell et al. | 709/224 |
| 5,566,351 A | * | 10/1996 | Crittenden et al. | 710/46 |
| 5,673,257 A | * | 9/1997 | Sharma et al. | 370/286 |
| 5,896,561 A | * | 4/1999 | Schrader et al. | 455/67.1 |
| 5,958,020 A | * | 9/1999 | Evoy et al. | 710/3 |
| 6,058,106 A | * | 5/2000 | Cudak et al. | 370/313 |
| 6,065,073 A | * | 5/2000 | Booth | 710/46 |

* cited by examiner

Primary Examiner—Arthur T. Grimley
Assistant Examiner—Mohammed Charioui
(74) Attorney, Agent, or Firm—Blakely Sokoloff Taylor Zafman LLP

(57) ABSTRACT

The present invention provides a method and apparatus for adjusting an interval of polling a peripheral device (e.g., printer) for status information, as based on the presence of a predetermined condition. In one embodiment of the present invention, short polling intervals are used to poll a peripheral device when a station (e.g., computer system) is not receiving adequate and/or reliable notification of interrupts/alerts that occur at the peripheral device. Long polling intervals are used to poll the peripheral device when the station is receiving adequate and/or reliable notification of interrupts that occur at the peripheral device.

37 Claims, 3 Drawing Sheets

METHOD AND APPARATUS FOR ADJUSTING AN INTERVAL OF POLLING A PERIPHERAL DEVICE IN RESPONSE TO CHANGES IN THE STATUS AND/OR RELIABILITY OF RECEIVING TRAPS

NOTICE OF RELATED APPLICATIONS

A separate application includes subject matter that may be related to the present application herein. The potentially related pending application is entitled Method and Apparatus For Adjusting An Interval of Polling A Network Printer based on Changes In The Working Status of the Network Printer assigned Ser. No. 09/112,697, filed on Jul. 8, 1998, by Dennis Carney and Ryan Nguyen.

FIELD OF INVENTION

The present invention relates to the management of one or more peripheral devices shared by one or more of stations (e.g., computers).

BACKGROUND OF THE INVENTION

Computers typically have peripheral devices (e.g., printers, scanners, etc.) interconnected to the computers via the network. The peripheral devices perform tasks at the request of the computers.

In order to collect current information about the status of a peripheral device, a computer may use a management application. The application may communicate with the peripheral devices via a communication protocol, such as Simple Network Management Protocol (SNMP). Alternative communication protocols may also be used.

In the case of a printer, one type of information collected by the management application typically includes whether an interrupt has occurred at the printer, such as the printer being out of paper or ink, a paper jam occurring, etc. The occurrence of an interrupt is sometimes referred to as an alert.

By discovering that an alert has occurred, an operator of a computer interconnected to the peripheral device, may take steps to resolve the interrupt to allow the routine operations of the peripheral device to resume. Alternatively, a computer interconnected with the printer may be able to resolve the alert without the intervention of an operator.

The management applications may collect status information (i.e., determine if an interrupt has occurred) from the peripheral device by periodically sending an inquiry to each device. The method of periodically requesting the information is commonly known as polling. The period of time between inquiries/polls is known as the polling interval.

A second technique for collecting status information from the peripheral device is to wait for notification from the peripheral device that an interrupt has occurred at the peripheral device. Notification of the interrupt sent from the peripheral device is commonly referred to as a trap. However, only certain peripheral devices support notifying the computer system that an interrupt has occurred at the peripheral device. The devices that support traps usually maintain a data structure such as a registration table that lists the addresses of the systems (e.g., TCP/IP addresses) to which the peripheral device will send traps.

The registration table may be generated by a series of management application (e.g., Simple Network Management Protocol) requests issued by the computer systems interconnected to the peripheral device. Moreover, the registration table may reside in a memory device local to the peripheral device, or alternatively may reside on a storage device separate from the peripheral device. The registration table may, however, be a fixed size, which would limit the number of computer systems that may receive traps.

In addition, there are issues regarding the reliability of transmitting the traps. More specifically, when using SNMP as the communication protocol, the traps are typically transferred using UDP, which does not guarantee delivery of the traps. As a result, if a trap is not properly delivered to an addressee, the intended recipient has no way of knowing that a trap was sent to them but has failed to arrive.

The management applications may use traps, polling, or both to discover changes in the peripheral device being monitored. For example, traps can be combined with a slow polling rate for a reasonable compromise between the reliability of polling and the increased network load that results from polling. However, a fixed algorithm of polling every X seconds and receiving traps as they occur, may not provide reliable monitoring of the peripheral device's status.

For example, if a computer suddenly becomes unregistered to receive traps, or had failed to successfully register, the rate of polling implemented at that time may not be frequent enough to satisfactorily monitor the status of the peripheral device.

Therefore, a need exists for adjusting the rate of polling peripheral devices as the status and/or reliability of receiving traps changes.

SUMMARY OF THE INVENTION

The present invention provides a method and apparatus for adjusting an interval of polling a peripheral device (e.g., printer) for status information, based on the status and/or reliability of receiving traps. In one embodiment of the present invention, short polling intervals are used to poll a peripheral device when a station (e.g., computer system) is not receiving adequate and/or reliable notification of interrupts/alerts that occur at the peripheral device. Long polling intervals are used to poll the peripheral device when the station is receiving adequate and/or reliable notification of interrupts that occur at the peripheral device.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

The present invention provides a method and apparatus for adjusting an interval of polling a peripheral device for status information, as based on the presence of a predetermined condition.

As is explained in more detail below, in one embodiment of the present invention, short polling intervals are used to poll a peripheral device when a computer system is not receiving adequate and/or reliable notification of interrupts that occur at the peripheral device. Conversely, long polling intervals are used to poll the peripheral device when the computer system is receiving adequate and/or reliable notification of interrupts that occur at the peripheral device.

In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Figure 1:
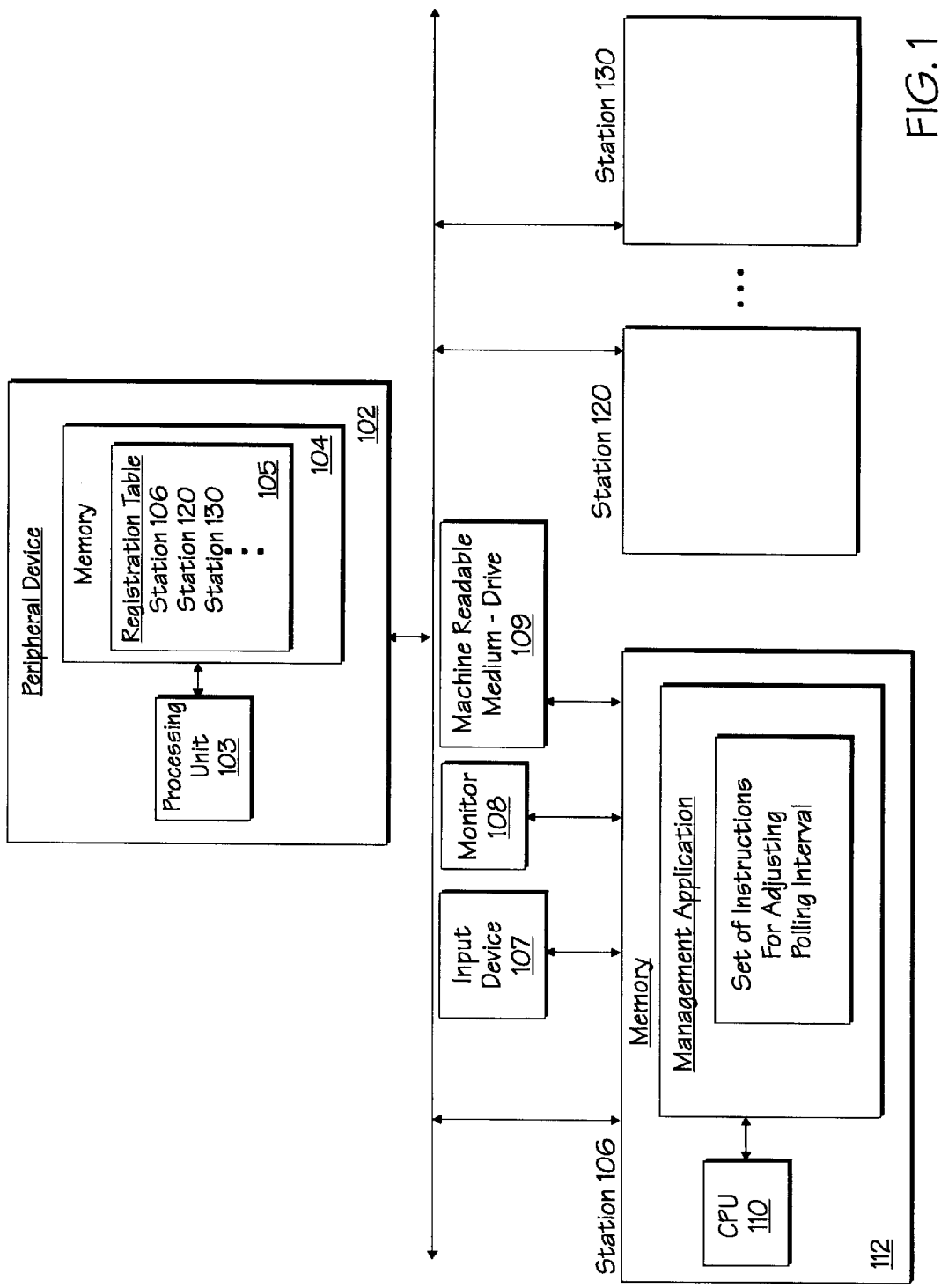
FIG. 1 illustrates a network configuration implementing one embodiment of the present invention.

FIG. 1 illustrates the interconnection of a peripheral device 102 (e.g., printer, and scanner) and a first station 106. It is within the scope of the present invention for station 106 to consist of a workstation, server, and personal computer system, set top box, or any other information handling device that may monitor the status of a peripheral device.

In the embodiment illustrated in FIG. 1, the station includes a input device 107 for entering data into station 106, a monitor 108 for displaying data, and a machine-readable medium drive 109 (e.g., disk drive) for providing access to data and instructions stored on machine readable medium. The station also internally includes a central processing unit (CPU) 110 for processing data and executing instructions, and memory unit 112 for storing data and groups of instructions (e.g., applications), which when executed perform desired operations.

One embodiment of station 106 is also illustrated in FIG. 1 as storing a management application in memory 110, which may provide the ability to monitor peripheral devices and set parameters on the peripheral devices. In one embodiment of the present invention, the management application communicates with peripheral device 102 via a Simple Network Management Protocol (SNMP) application based on User Datagram Protocol/Internet Protocol (UDP/IP). Alternative communication protocols may also be used without departing from the scope of the present invention.

As is also shown in FIG. 1, the management application includes a set of instructions for adjusting the interval of polling the peripheral device, according to one embodiment of the present invention, as is described in more detail below. In alternative embodiments, the set of instructions for adjusting the interval of polling the peripheral device could be stored in memory exclusive of the management application, or alternatively, could be implemented in hardware circuitry or firmware (e.g., Read Only Memory), and referred to as a first device.

Also shown in FIG. 1 is peripheral device 102 consisting of processing unit 103 and memory 104 having stored therein registration table 105. Registration table 105 is shown to include a list of addresses (e.g., TCP/IP addresses) for the stations that are to receive notification of when an interrupt occurs at peripheral device 102. The number of entries present in registration table 105 may vary within the scope of the present invention.

In addition, the location of the registration table may also vary within the scope of the invention. For example, the registration may be stored on a machine-readable medium accessible via a disk drive coupled to the peripheral device or in Random Access Memory (RAM) within a separate device coupled to the peripheral device.

As is illustrated in FIG. 1 peripheral device 102 and station 106 may be interconnected in a network configuration (e.g., Local Area Network (LAN)) that includes additional stations interconnected with the peripheral device. It is within the scope of the present invention, however, to have only one station connected with the peripheral device.

Figure 2:
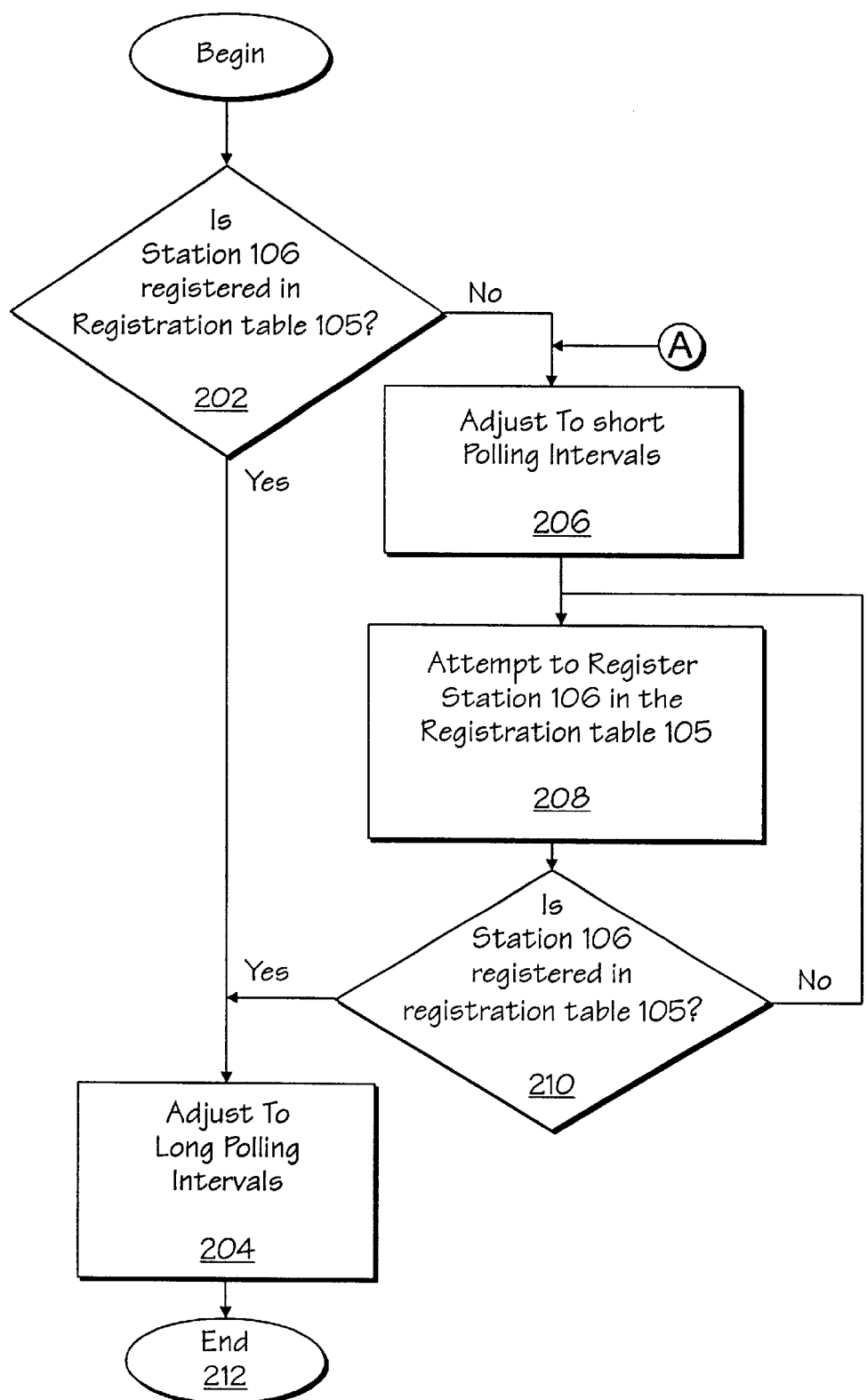
FIG. 2 illustrates a flow diagram describing the steps of the present invention according to one embodiment.

FIG. 2 illustrates a flow diagram describing the steps of adjusting the interval of polling a peripheral device according to one embodiment of the present invention. The steps described in FIG. 2 are performed when the set of instructions for adjusting the interval of polling a peripheral device is executed. In step 202, station 106 determines whether it is to register in registration table 105 to receive traps.

If station 106 is registered to receive traps, in step 204, station 106 will adjust the interval of polling the peripheral device by increasing the time between the polling inquiries (i.e., use long polling intervals). As a result of using long polling intervals, the network traffic between station 106 and peripheral device 102 is decreased. In one embodiment, the adjusting of the interval of polling a peripheral device is done dynamically and automatically, without the intervention of a user operator.

On, the other hand, if station 106 is not registered to receive traps, in step 206, station 106 may adjust the interval of polling the peripheral device by decreasing the time between the polling inquiries (i.e., use short polling intervals). In step 208, station 106 may then attempt to register in registration table 105 of peripheral device 102.

In one embodiment of the present invention, polling inquiries are sent to the peripheral device in accordance with a timer, which is reset after each polling inquiry is sent to the peripheral device. Adjusting the interval of polling the peripheral device may be performed by lengthening or shortening the setting of a timer, in accordance with the desired rate of polling the peripheral device.

In one embodiment of the present invention, an attempt to register a station to receive traps occurring at a peripheral device may be integrated with a preestablished periodic polling inquiry. For example, as a part of a pre-established periodic polling inquiry to determine if an alert has occurred at the respective peripheral device, the respective station may also read the registration table to determine if a slot has become available. Alternatively, the attempt to register a station may be separate from a pre-established periodic polling inquiry.

In step 210, station 106 determines if it has successfully registered in registration table 105. If station 106 was unable to successfully register to receive traps, polling of the peripheral device remains unchanged (i.e., continues to use short polling intervals) and processing of the present invention may return to step 208 to again attempt to register station 106 in registration table 105.

In the present invention, the number of times station 106 attempts to register with registration table 105 may vary in the scope of the invention. Moreover, the length of time between the attempts to register with registration table 105 may also vary in the scope of the invention.

If station 106 has successfully registered in registration table 105, then in step 204, station 106 will adjust the interval of polling the peripheral device by increasing the time between the polling inquiries (i.e., use long polling intervals). Once station 106 has successfully registered to receive notification of traps that occur at peripheral device 102 and has adjusted the interval of polling the peripheral device, (or alternatively, has exceeded a predetermined number of attempts to register in registration table 105), the processing of the present invention is completed in step 212, according to one embodiment.

Figure 3:
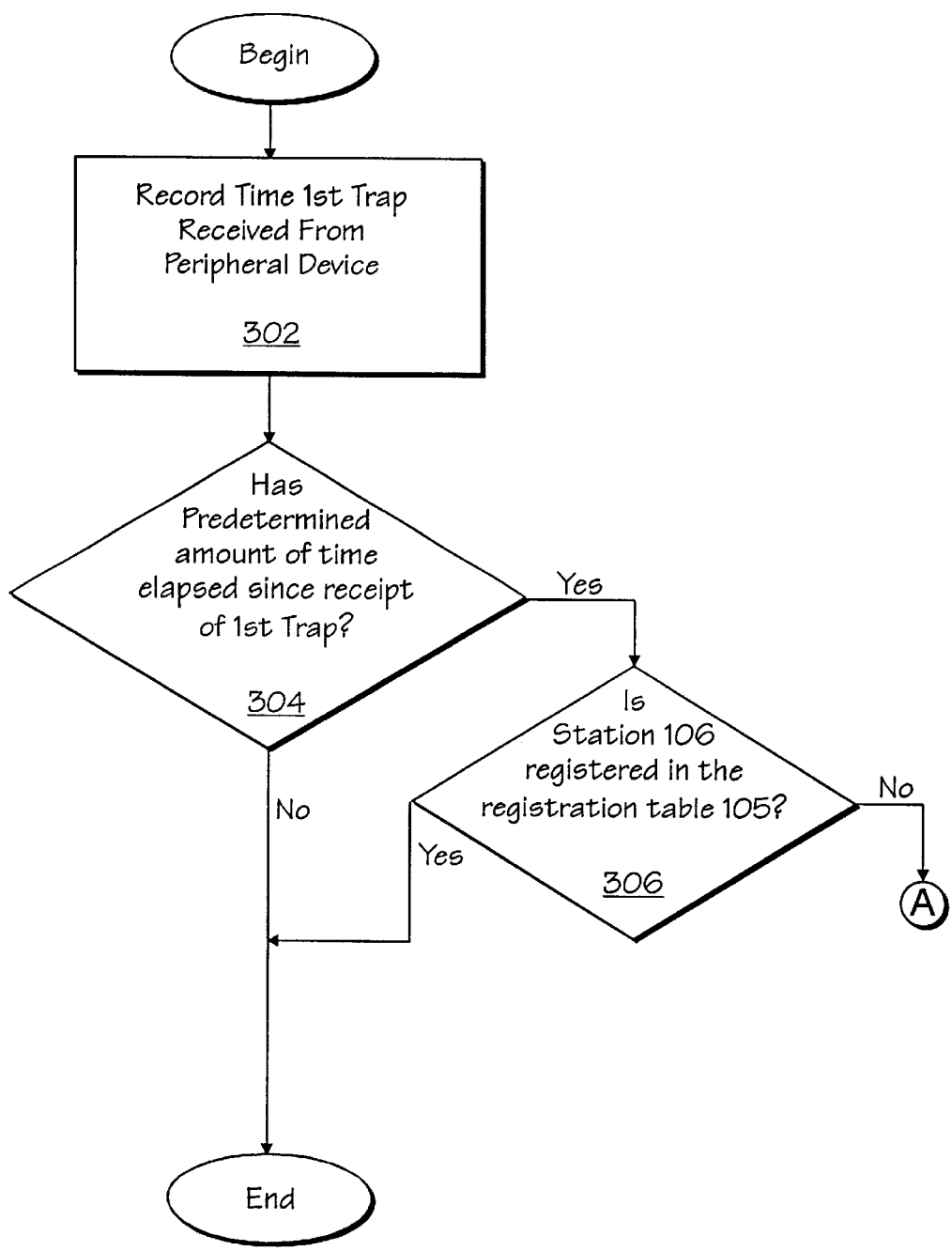
FIG. 3 illustrates a flow diagram describing the steps of the present invention according to an alternative embodiment.

FIG. 3 illustrates a flow diagram describing the steps of an alternative embodiment of the present invention that may be processed when a station is considered to be successfully registered to receive traps.

In step 302, station 106 will record a time when a trap is received from peripheral device 102. Thereafter, in step 304, station 106 will determine, if a predetermined amount of time elapses before a second trap is received from peripheral device 102. If station 106 receives a second trap from peripheral device 102 before the predetermined amount of time elapses, processing of the alternative embodiment is completed in step 306. Thereafter, steps 302 through 306 may be repeated on successive traps.

Conversely, if station 106 does not receive a second trap from peripheral device 102 within the predetermined amount of time, in step 308 station 106 will determine if it remains registered in registration table 105.

If station 106 is no longer registered in registration table 105, processing of the present invention may return to step 206 of FIG. 2 and adjust the interval of polling the peripheral device by decreasing the time between the polling inquiries (i.e., use short polling intervals). Thereafter, the processing of the present invention may proceed to step 208 and attempt to re-register station 106 in registration table 105 of peripheral device 102.

In alternative embodiments of the present invention, if station 106 does not receive a second trap from peripheral device 102 within a predetermined period of time, station 106 may consider the notification of traps occurring at peripheral device 102 to be unreliable. As a result, station 106 may adjust the interval of polling the peripheral device by decreasing the time between the polling inquiries (i.e., use short polling intervals), without regard to whether station 106 remains registered in registration table 105.

In another alternative embodiment of the present invention, station 106 may discover during a polling inquiry of peripheral device 102 that an alert has occurred at peripheral device 102. Thereafter, station 106 may verify that it had not received a trap corresponding to the discovered alert that occurred at peripheral device 106. As a result, station 102 may consider traps sent from peripheral device 106 to be unreliable. In response, station 106 may adjust the interval of polling the peripheral device by decreasing the time between the polling inquiries (i.e., use short polling intervals).

The present invention of adjusting the interval of polling a peripheral device, may be provided as a computer program product which may include a machine readable medium having stored thereon instructions which can be used to program a computer (or other electronic devices) to perform a process according to the present invention. The machine readable medium may include, but is not limited to a floppy disks, optical disks, CD-ROMs, and magneto-optical disks, ROMs, RAMs, EPROMs, EEPROMs, magnet or optical cards, or any type of media/machine readable medium suitable for storing electronic instructions.

Moreover, the present invention of adjusting the interval of polling a peripheral device, may also be downloaded as a computer program product, wherein the program would be transferred from a remote computer to a requesting computer by means of a communication link (e.g., a modem or network connection).

In the foregoing specification the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than restrictive sense.

What is claimed is:

1. A method for monitoring proper functioning of a peripheral device, the method comprising:
   determining if a first station is registered, at a registration table, with said peripheral device to receive traps; and
   adjusting an interval of polling said peripheral device in response to the result of said determination.

2. The method of claim 1, wherein if said first station is registered with said peripheral device to receive traps, said interval of polling occurs at a first rate; and
   if said first station is not registered with said peripheral device to receive traps, said interval of polling occurs at a second rate, wherein said first rate is less frequent than said second rate.

3. The method of claim 2, further including the steps of:
   after said first station receives a first trap from said peripheral device, determining if a predetermined amount of time passes before a second trap is received from said peripheral device.

4. The method of claim 3, wherein in response to said predetermined amount of time passing before said second trap is received, determining if said first station is registered to receive traps from said peripheral device; and
   in response to said first station not being registered to receive traps from said peripheral device, adjusting said interval of polling to said second rate.

5. The method of claim 4, wherein in response to said first station not being registered to receive traps from said peripheral device, said first station attempts to register to receive traps from said peripheral device.

6. The method of claim 4, wherein said step of determining if said first station is registered to receive traps from said peripheral device, includes an inquiry separate from a regular polling request to determine if an alert has occurred at said peripheral device.

7. The method of claim 4, wherein said step of determining if said first station is registered to receive traps from said peripheral device, includes an inquiry that is part of a regular polling request to determine if an alert has occurred at said peripheral device.

8. The method of claim 4, wherein said peripheral device is coupled to a plurality of stations.

9. The method of claim 4, wherein said peripheral device is a printer.

10. The method of claim 3, wherein said interval of polling is adjusted dynamically.

11. The method of claim 10, wherein said interval of polling is adjusted automatically.

12. The method of claim 2, further including the steps of:
    attempting to register said first station to receive traps from said peripheral device;
    in response to said first station successfully registering to receive traps from said peripheral device, adjusting said interval of polling said peripheral device to said first rate; and
    in response to said first station being unsuccessful in registering to receive,traps from said peripheral device, continuing said interval of polling said peripheral device at said second rate.

13. The method of claim 2, further including the steps of:
    discovering an alert has occurred as said peripheral device;
    verifying that said first station did not receive a trap corresponding to said alert that occurred at said peripheral device; and
    adjusting said interval of polling said peripheral device to said second rate.

14. A machine readable medium having stored thereon a set of instructions for monitoring proper functioning of a peripheral device, said set of instructions when executed by a station, cause said station to:
 determine if a first station is registered, at a registration table, with said peripheral device to receive traps; and
 adjust an interval of polling said peripheral device in response to the result of said determination.

15. The machine readable medium of claim 14, wherein if said first station is registered with said peripheral device to receive traps, said interval of polling occurs at a first rate; and
 if said first station is not registered with said peripheral device to receive traps, said interval of polling occurs at a second rate, wherein said first rate is less frequent than said second rate.

16. The machine readable medium of claim 15, wherein said set of instructions includes additional instructions which, when executed by said station, cause said station to:
 after said first station receives a first trap from said peripheral device, determine if a predetermined amount of time passes before a second trap is received from said peripheral device.

17. The machine readable medium of claim 16, wherein in response to said predetermined amount of time passing before said second trap is received, determining if said first station is registered to receive traps from said peripheral device; and
 in response to said first device not being registered to receive traps from said peripheral device, adjusting said interval of polling to said second rate.

18. The machine readable medium of claim 17, wherein said set of instructions includes additional instructions which when executed by said station, cause said station to:
 attempt to register said first station to receive traps from said peripheral device in response to said first station not being registered to receive traps from said peripheral device.

19. The machine readable medium of claim 18, wherein determining if said first device is registered to receive traps from said peripheral device, includes an inquiry separate from a regular polling request to determine if an alert has occurred at said peripheral device.

20. The machine readable medium of claim 18, wherein determining if said first station is registered to receive traps from said peripheral device, includes an inquiry that is part of a regular polling request to determine if an alert has occurred at said peripheral device.

21. The machine-readable medium of claim 17, wherein said interval of polling is adjusted dynamically.

22. The machine-readable medium of claim 21, wherein said interval of polling is adjusted automatically.

23. The machine-readable medium of claim 17, wherein said peripheral device is a printer.

24. The machine-readable medium of claim 17, wherein said peripheral device is coupled to a plurality of stations.

25. The machine readable medium of claim 15, wherein said set of instructions includes additional instructions which when executed by said station, cause said station to:
 attempt to register said first station to receive traps from said peripheral device;
 in response to said first station successfully registering to receive traps from said peripheral device, adjust said interval of polling said peripheral device to said first rate; and
 in response to said first station being unsuccessful in registering to receive traps from said peripheral device, continue said interval of polling said peripheral device at said second rate.

26. The machine-readable medium of claim 15, wherein said set of instructions includes additional instructions which, when executed by said station, cause said station to:
 discover an alert has occurred at said peripheral device;
 verify that said first station did not receive a trap corresponding to said alert that occurred at said peripheral device; and
 adjust said interval of polling said peripheral device to said second rate.

27. A computer system comprising:
 a processing unit; and
 a first device coupled to said processing unit, said first device to monitor proper functioning of a peripheral device, while monitoring said peripheral device said first device determines if a first station is registered, at a registration table, with said peripheral device to receive traps and adjusts an interval of polling said peripheral device in response to the result of said determination.

28. The computer system of claim 27, wherein if said first station is registered with said peripheral device to receive traps, said first device adjust said interval of polling to a first rate; and
 if said first station is not registered with said peripheral device to receive traps, said first device adjust said interval of polling to a second rate, wherein said first rate is less frequent than said second rate.

29. The computer system of claim 28, wherein after said computer system receives a first trap from said peripheral device, said first device determines if a predetermined amount of time passes before a second trap is received from said peripheral device.

30. The computer system of claim 29, wherein in response to said predetermined amount of time passing before said second trap is received, said first device determines if said computer system is registered to receive traps from said peripheral device; and
 in response to said computer system not being registered to receive traps from said peripheral device, said first device adjust said interval of polling to said second rate.

31. The computer system of claim 30, wherein in response to said first station not being registered to receive traps from said peripheral device, said first station attempts to register to receive traps from said peripheral device.

32. The computer system of claim 30, wherein determining if said first device is registered to receive traps from said peripheral device, includes an inquiry separate from a regular polling request to determine if an alert has occurred at said peripheral device.

33. The computer system of claim 30, wherein determining if said first station is registered to receive traps from said peripheral device, includes an inquiry that is part of a regular polling request to determine if an alert has occurred at said peripheral device.

34. The computer system of claim 32, wherein said peripheral device is a printer.

35. The computer system of claim 28, wherein said first device dynamically adjust said interval of polling.

36. The computer system of claim 35, wherein said first device automatically adjusts said interval of polling.

37. The computer system of claim 28, wherein said first device
 attempts to register said computer system to receive traps from said peripheral device;
 in response to said computer system successfully registering to receive traps from said peripheral device, said first device adjust said interval of polling said peripheral device to said first rate; and in response to said computer system being unsuccessful in registering to receive traps from said peripheral device, said first device adjust said interval of polling said peripheral device to said second rate.

* * * * *